Patented Nov. 6, 1951

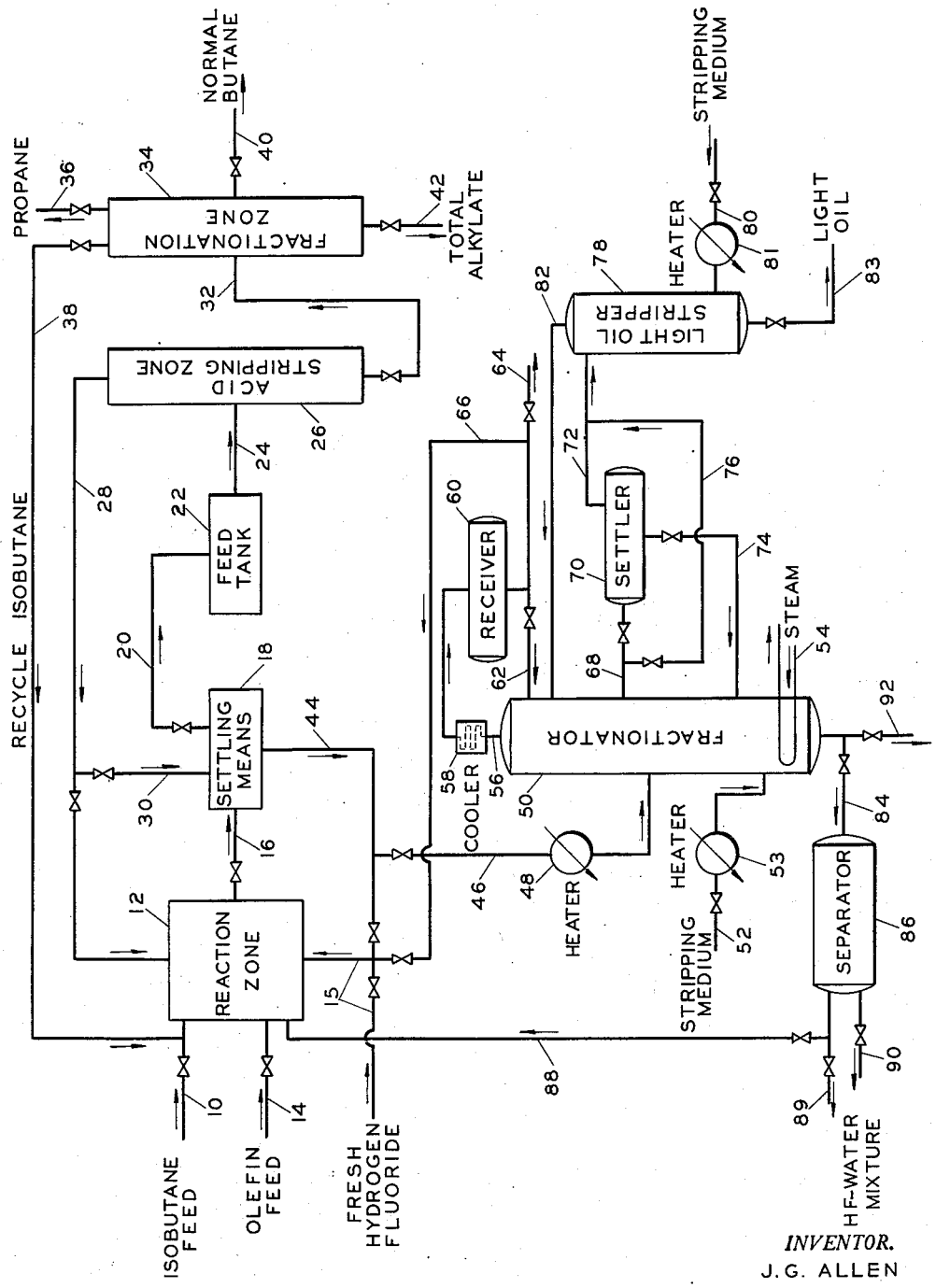

2,574,006

UNITED STATES PATENT OFFICE 2,574,006

METHOD OF RECOVERING HYDROGEN FLUORIDE IN AN ALKYLATION PROCESS

John Gordon Allen, Bartlesville, Okla., assignor to Phillips Petroleum Company, a corporation of Delaware Application October 17, 1947, Serial No. 780,312

6 Claims. (Cl. 260—683.4)

This invention relates to an improved process for the alkylation of hydrocarbons. In one embodiment it relates to the alkylation of paraffinic hydrocarbons with olefinic hydrocarbons in the presence of hydrogen fluoride as catalyst. In one specific embodiment it relates to a method for regenerating used hydrogen fluoride catalyst from an alkylation process.

The reaction of alkylatable paraffinic hydrocarbons with olefinic hydrocarbons to produce higher molecular weight paraffinic hydrocarbons is a well known method for the manufacture of high anti-knock motor fuels. Also, the alkylation of aromatic hydrocarbons with olefins is well known. Various catalysts, such as a metal halide with a hydrogen halide promoter, phosphoric acid, sulfuric acid and hydrofluoric acid, have been proposed for these reactions. However, catalysts which contain hydrogen fluoride as their essential ingredient offer certain advantages in the alkylation reactions over other catalysts. For example, when using a hydrogen fluoride catalyst the alkylation reaction may be conducted at a substantially higher temperature than is feasible when using sulfuric acid which tends to induce undesirable side reactions at higher temperatures. Moreover, hydrogen fluoride which dissolves in the hydrocarbon reaction products may be recovered readily and returned to the process for re-use.

In hydrogen fluoride alkylation processes, substantially anhydrous fluoride is ordinarily charged to the process but after a period of use the catalyst becomes contaminated with water and organic material which decreases the effective hydrogen fluoride concentration to such an extent that the alkylating activity of the catalyst begins to decline. By withdrawing a portion of the contaminated catalyst from the system, either intermittently or continuously, and replacing the withdrawn catalyst with fresh or regenerated catalyst of higher hydrogen fluoride concentration, it is possible to maintain the desired level of catalyst activity. It is known that regeneration of the contaminated catalyst can be accomplished by a distillation step or steps. The catalyst may be introduced after suitable preheating into fractionation means wherein an overhead stream comprising substantially anhydrous hydrogen fluoride and light hydrocarbons are separated from a bottoms product comprising largely higher boiling organic materials and a water-hydrogen fluoride mixture.

In the regeneration of used hydrogen fluoride as mentioned above, difficulty is experienced in recovering high yields of purified hydrogen fluoride. If the regeneration unit is operated so as to obtain substantially pure hydrogen fluoride and at the same time rejecting all acid soluble organic material and acid-water mixture, an appreciable quantity of recoverable hydrogen fluoride is lost as it is dissolved in the rejected organic material and the acid-water mixture. In turn, if the temperature on the kettle of the fractionator is then raised to insure the passing overhead of all of the uncombined hydrogen fluoride, a substantial quantity of acid soluble organic material is also distilled overhead resulting in undesirable contamination of the regenerated hydrogen fluoride and thereby lowering the acidity of the regenerated acid.

The present invention comprises an improved process for the regeneration of a used hydrogen fluoride catalyst. In one embodiment my invention comprises an improved process for the regeneration of a used hydrogen fluoride catalyst which includes the following steps: subjecting the used hydrogen fluoride catalyst to a fractionation zone wherein substantially anhydrous hydrogen fluoride and light hydrocarbons are removed overhead, withdrawing a bottom product comprising heavy viscous acid-soluble organic materials together with a water-hydrogen fluoride mixture, withdrawing an intermediate side stream from said fractionation zone comprising light acid-soluble organic material together with some hydrogen fluoride and light hydrocarbons, passing the intermediate stream to a settler for removal of entrained heavy materials, passing the light acid-soluble organic material from the settler to a stripping column where light hydrocarbons and hydrogen fluoride are removed overhead and returned to the fractionation zone, while stripped light acid-soluble organic material is removed as a bottoms product from the stripper.

The object of this invention is to provide an improved method for alkylation of hydrocarbons.

Another object is to provide an improved process for alkylation of paraffinic hydrocarbons and olefinic hydrocarbons in the presence of hydrogen fluoride as catalyst.

Still another object is to provide a method for the regeneration of used hydrogen fluoride.

Still another object is to provide an improved method for the recovery of hydrogen fluoride contaminated with organic material.

A further object is to provide a method for purifying hydrogen fluoride contaminated with organic material and hydrofluoric acid-water azeotrope.

Still another object of this invention is to treat used hydrogen fluoride from a hydrogen fluoride alkylation unit, thereby recovering high purity hydrogen fluoride in high yield.

Other objects and advantages of this invention will be apparent to one skilled in the art from the accompanying disclosure and description.

I have found in the alkylation of hydrocarbons using hydrogen fluoride as catalyst that both light and heavy acid-soluble organic materials are formed in the reactors with resultant contamination of the acid catalyst. The light oils so produced constitute about 55–75 percent by weight of the total oils depending upon the end point of the light oil. Usually I consider 400° F. as the maximum end point for the light oils. Also, it has been found that most of the sulfur compounds present in the feed stock to the alkylation reactor concentrate in the light oil fraction as dialkyl sulfides. In fact the light oil seems to be composed chiefly of these dialkyl sulfides. The heavy acid-soluble oil fraction contains much less sulfur than the light oil fraction. As the sulfur content of the hydrocarbon feed to the alkylation zone is increased the quantity of the light sulfur-containing acid-soluble oils is increased and if not removed from the alkylation system, the quality of the acid catalyst will be impaired and the sulfur content of the alkylate will be increased to the detriment of anti-knock quality. The removal of these light oils by known means is accompanied by excessive losses of hydrogen fluoride. The characteristics of a typical example of these acid-soluble organic materials formed in a hydrofluoric acid isobutane-butylenes alkylation process are given in the table.

Table

A. Total acid-soluble organic material:

| | |
|---|---|
| Gravity: A. P. I. | 37.0 |
| Sulfur: Wt. percent | 17.7 |
| Fluorine: Wt. percent | 0.216 |
| Iodine No. | 200 |
| Color (N. P. A.) | 4 |

B. Light acid-soluble organic material:

| | |
|---|---|
| Total oils: Wt. percent | 72 |
| Sulfur: Wt. percent | 23.7 |
| ASTM distillation °F. I. B. P. | 117 |
| 5 percent | 206 |
| 10 | 212 |
| 30 | 248 |
| 50 | 248 |
| 60 | 257 |
| 70 | 270 |
| 80 | 298 |
| 90 | 324 |
| E. P. | 392 |

C. Heavy acid-soluble organic material:

| | |
|---|---|
| Total oils: Wt. percent | 28 |
| Sulfur: Wt. percent | 2.1 |

I have discovered a method for regenerating spent hydrogen fluoride catalyst by which a lower sulfur content heavy high boiling acid-soluble oil is obtained. This low sulfur heavy oil may be used as a desulfurizing agent as described in my Patent U. S. 2,414,626 which issued January 21, 1947. Also, by my acid regeneration process a light oil fraction is obtained with a minimum loss of catalyst and at the same time maintaining a higher purity and yield of regenerated acid. This method will provide the additional benefit of reducing the quantity of used hydrogen fluoride charged to the rerun unit to maintain the desired acidity in the process. Also, the build-up of sulfur in the alkylation and regeneration systems will be prevented or at least substantially reduced.

The accompanying drawing is a diagrammatic illustration of an arrangement of apparatus suitable for conducting the process of the present invention.

Isobutane feed is introduced through line 10 to reaction zone 12 where it is contacted with an olefin feed and hydrogen fluoride catalyst which are introduced into reaction zone 12 by way of lines 14 and 15 respectively. The resulting reaction mixture in reaction zone 12 is maintained under alkylating conditions and the reaction mixture effluent from reaction zone 12 passes through line 16 to settling means 18 where the reaction mixture is separated into a catalyst phase and a hydrocarbon phase. The hydrocarbon phase passes through line 20, feed tank 22 and line 24 to acid stripping zone 26 where entrained hydrogen fluoride and some light hydrocarbon material are removed and recycled through line 28 to reaction zone 12 or a portion of the hydrogen fluoride-hydrocarbon mixture may be returned to settling means 18 by way of line 30, if desired. The remaining hydrocarbon material passes through line 32 to fractionation zone 34 where it is fractionated into various fractions as desired. Propane and lighter are removed through line 36; isobutane is removed through line 38 and recycled to reaction zone 12, normal butane is removed through line 40 and the total alkylate is removed from fractionation zone 34 through line 42 for further treating and fractionation as desired.

The catalyst phase from settling means 18 is removed through line 44 and a portion thereof is recycled through line 15 to reaction zone 12. A portion of the catalyst phase is removed from line 44 and passes through line 46 containing heater 48 to fractionator 50. The contents of fractionator 50 are heated by means of steam circulated through coil 54 located near the bottom of fractionator 50 whereby at least a portion of hydrogen fluoride contained in the catalyst phase is released therefrom and removed through line 56. Also, if desired, a stripping medium, such as isobutane, may be introduced through line 52 containing heater 53 into the lower portion of fractionator 50 for the purpose of augmenting the removal of the hydrogen fluoride from the catalyst phase. The catalyst phase comprises a mixture of light and heavy organic material as well as hydrogen fluoride. Recovered hydrogen fluoride is removed through line 56 containing cooler 58 and is introduced as a liquid into receiver 60. From receiver 60 a portion of the recovered hydrogen fluoride is returned to fractionator 50 through line 62 as a reflux for fractionator 50, and a portion of it is returned to reaction zone 12 by way of lines 66 and 15. If desirable, a portion of the purified hydrogen fluoride may be removed from the system through line 64. An intermediate fraction, comprising light acid soluble material is removed from fractionator 50 through line 68 and is introduced into settler 70 where any heavy material, such as entrained hydrofluoric acid-water mixture, settles out of the acid soluble material and is returned to fractionator 50 by way of line 74. The light organic material, which contains some entrained hydrogen fluoride and light hydrocarbon material, passes through line 72 to light oil stripper 78. If desirable, the light oil fraction which passes through line 68 from fractionator 50 may be caused to by-pass settler 70 and be introduced directly into light oil stripper 78 through lines 76 and 72. The entrained hydrogen fluoride and light hydrocarbons are removed from light oil stripper 78 by means of a suitable stripping medium, such as isobutane or isopentane, or the like which is introduced into stripper 78 through line 80 containing heater 81. The stripping medium plus hydrogen fluoride and other light hydrocarbon material pass from stripper 78 through line 82 to fractionator 50. The resulting light oil is removed from stripper 78 through line 83 for further handling as desired. The heavy oil and hydrogen fluoride-water azeotrope are removed from fractionator 50 through line 84 to separator 86. The heavy oil and hydrogen fluoride-water azeotrope are separated in separator 86 into an oil phase and hydrofluoric acid-water phase. A portion of the heavy oil may be returned through line 88 to reaction zone 12 for use as a desulfurizing agent, or all of it may be removed from the system through line 89, if desired. The hydrogen fluoride-water azeotrope may be removed through line 90 for further treatment, as desired, to recover the hydrogen fluoride. Also, if desired, all or a portion of the mixture of heavy oil and hydrogen fluoride-water azeotrope from the bottom of the fractionator 50 may be removed from the system through line 92.

It is preferable that the location of line 68 be so located in the fractionator 50 so that little or no hydrogen fluoride-water azeotrope is present in the stripper feed since any of the hydrogen fluoride-water mixture carried over to the stripper would be removed and returned to the fractionator where it may be carried overhead thereby contaminating the purified acid. Settler 70 is added between fractionator 50 and stripper 78 to materially eliminate such a possibility. It is desirable therefore that substantially all of the water entering fractionator 50 be removed as hydrogen fluoride-water azeotrope in the kettle product from the fractionator 50.

In the accompanying diagrammatic drawing reference to some of the equipment such as pumps, gages and the like which obviously would be necessary to actually operate the process of my invention have been intentionally omitted. Only sufficient equipment has been shown to illustrate the purpose of my invention and it is intended that no undue limitation be read into this invention by references to the drawing and discussion thereof.

By the term hydrogen fluoride catalyst, which is used throughout this specification and appended claims it is intended to include catalysts whose essential active ingredient is hydrogen fluoride. It is within the scope of my invention, therefore, to employ hydrogen fluoride which contains minor amounts of other substances, for example, water or promoters such as boron trifluoride. Although usually commercial "anhydrous" hydrogen fluoride will be utilized in the alkylation process, it is permissible to have as high as about 10% water present in the catalyst. Excessive dilution with water must be avoided, however, since it will result in a decline in the alkylating activity of the catalyst.

The alkylation of isoparaffins with olefins in the presence of a hydrogen fluoride catalyst is effected at temperatures of the order of from about 0° F. to about 200° F. although a more preferable range is from about 50° F. to about 150° F. Under certain circumstances even lower temperatures may be employed. The pressure in the alkylation zone is ordinarily maintained sufficiently high to insure substantially liquid phase operation. The time relationship may be expressed by means of the so-called "space time" which is defined as the volume of catalyst within the reaction zone divided by the volume rate per minute of hydrocarbon reactants charged to the zone. Usually the space time will fall within the range of from about 5 to about 80 minutes although in certain cases it may be desirable to extend this range in either direction. As is well-known in the alkylation art an excess of alkylatable paraffins over olefins should be maintained in the alkylation zone at all times, e. g., a mol ratio of alkylatable paraffins to olefins from about 3:1 or 4:1 to about 10:1 or even higher.

In operating the hydrogen fluoride regeneration unit in accordance with my invention, contaminated hydrogen fluoride catalyst from an alkylation process is heated from about 235° to about 260° F. or higher, depending upon the specific characteristics of the used catalyst material. This heated material is then introduced into a suitable fractionating column maintained under suitable operating conditions, such as temperature and pressure, to remove hydrogen fluoride from the used catalyst material. The temperature at the bottom of the fractionating zone is usually maintained at between about 260° and about 300° F., depending again upon the particular material being treated. But usually it is preferable to use a temperature in the range of about 270° to 280° F. at the bottom of the fractionator. A preferred pressure of about 25 to 50 pounds per square inch absolute is maintained on the bottom of the fractionator; however, if a higher temperature is used than that indicated a correspondingly higher pressure may be employed. The temperature at the top of the fractionating column may be in the range of about 85° to 115°, but usually about 95° to 110° is preferable. A pressure in the range of about 20 to 40 pounds per square inch absolute in the top of the column is usually sufficient for the temperature. A stripping medium, such as isobutane, isopentane, or the like, may be introduced into the fractionating column near the bottom, and at a sufficient temperature and in sufficient quantities to aid in stripping the hydrogen fluoride from the used catalyst. The intermediate side stream from the fractionator is withdrawn and passed to a stripper where it is stripped of hydrogen fluoride by means of a stripping medium such as isobutane. The particular amount of isobutane used, and the exact temperature and pressure maintained in the stripper is not critical. However the stripping medium and the stripper contents are maintained at a temperature sufficient to strip the hydrogen fluoride from the organic material in said stripper without carrying overhead any substantial amounts of the light acid-soluble organic material.

In operating my improved hydrogen fluoride regenerating system it is preferable to keep the water in the alkylation system to a minimum by very efficient drying of all hydrocarbon feed streams before they enter the reaction zone.

This invention is not to be limited by any theories as to nature and method of formation of the light and heavy acid-soluble organic materials. Inspection of the light oils indicate they probably are comprised of dialkyl sulfides, having alkyl groups such as methyl, ethyl, isopropyl, tertiary butyl, secondary butyl, tertiary amyl, and secondary amyl, etc. Absence of mercaptans is indicated by absence of the mercaptan odor. It is theorized that the sulfides are formed by alkylation of the mercaptans, such as methyl mercaptan and ethyl mercaptan, normally present in the olefin feed which usually comprises with propylene, butylenes or amylenes. At any rate, the use of a regeneration unit of the character described would offer an additional advantage of providing a process where the olefin feed need not necessarily be caustic washed to remove mercaptans since said mercaptans are rejected from the acid regeneration unit rather than building up to a deleterious quantity in the alkylate products. My invention is not limited to regeneration of used hydrogen fluoride from paraffin and aromatic alkylation processes, but is intended to cover regeneration of hydrogen fluoride from other conversion processes employing hydrogen fluoride as catalyst, such as isomerization, disproportionation or the like.

Used hydrofluoric acid catalyst from an isobutane butylene hydrofluoric acid alkylation process having the following percentage by weight composition: hydrogen fluoride 86.0, acid-soluble oils 5.0, light hydrocarbon 7.2, and water 1.2, is passed through a heating unit where it is heated to about 250° F., and introduced into a fractionating column containing about twenty trays. The bottom of the fractionating column is heated by means of steam coils, in the conventional manner, and the kettle product is maintained at a temperature of about 275° F., and at a pressure of about thirty pounds per square inch absolute. A stripping medium, namely isobutane, is introduced into the fractionating column near the bottom to aid in stripping hydrogen fluoride from the kettle product. The hydrogen fluoride and light hydrocarbons are removed from the top of the fractionating column which is maintained at a temperature of about 100° F., and at a pressure of about twenty-seven pounds per square inch absolute. The hydrocarbon fluoride-hydrocarbon mixture is condensed and introduced into a receiver where it separates into an acid phase and a hydrocarbon phase. A portion of the liquefied hydrogen fluoride is returned to the fractionator as a reflux. The hydrocarbon phase (chiefly isobutane) is removed for further use as desired. The isobutane may be used in the alkylation system or for further stripping purposes. The hydrogen fluoride which is not recycled to the fractionator as reflux is removed from the regeneration system for further use as desired and represents about 94 percent of the original charge and has a purity of about 97.6.

The kettle product which comprises heavy oil and acid-water azeotrope is removed from the bottom of the fractionator and amounts to about 4 percent by weight of the original charge.

An intermediate side stream is withdrawn from the fractionator at a point at about the eleventh tray from the bottom. The temperature at this point is about 245° F. The material so removed is passed to a stripper where absorbed hydrogen fluoride is removed by stripping with isobutane and the isobutane-hydrogen fluoride mixture is returned to the fractionator. The resultant light oil which amounts to about 2 percent by weight of the original charge is removed from the bottom of the fractionator.

It is to be understood that this invention should not be necessarily limited to the above discussion and description and that modifications and variations may be made without departing substantially from the invention or from the scope of the claims.

I claim:
1. In a process for the alkylation of alkylatable paraffins with olefins which comprises subjecting alkylatable paraffins and olefins to contact under alkylation conditions in an alkylation zone with hydrogen fluoride catalyst; separating a reaction mixture effluent from said alkylation zone into a hydrocarbon phase and a catalyst phase; passing at least a portion of said catalyst phase to a fractionation zone; removing a mixture of hydrogen fluoride and low boiling hydrocarbons from an upper portion of said fractionation zone; returning at least a portion of said mixture to said alkylation zone; withdrawing a stream comprising light acid-soluble organic material and hydrogen fluoride intermediate an upper portion and a lower portion of said fractionation zone; passing said stream to a settling zone where a hydrocarbon phase is separated therefrom; passing said resulting hydrocarbon phase to a stripping zone and removing therefrom absorbed hydrogen fluoride; and returning the resulting hydrogen fluoride to an upper portion of said fractionation zone.

2. In a process for the alkylation of alkylatable paraffins with olefins which comprises subjecting alkylatable paraffins and olefins to contact under alkylation conditions in an alkylation zone with hydrogen fluoride catalyst; separating a reaction mixture effluent from said alkylation zone into a hydrocarbon phase and a catalyst phase; heating at least a portion of said catalyst phase to a temperature in the range between 235 and 260° F. and passing the resulting heated material to a fractionating column; maintaining the temperature at the bottom of said fractionating column in the range between 260 and 300° F. and a pressure in the range of between 25 and 50 pounds per square inch absolute, and maintaining the temperature at the top of said fractionating column in the range between 85 and 115° F. and a pressure in the range between 20 and 40 pounds per square inch absolute; introducing a hydrocarbon stream comprising paraffins to be alkylated in said alkylation zone into said fractionating column near the bottom thereof to aid in stripping the hydrogen fluoride from said catalyst phase; removing a mixture of hydrogen fluoride and low boiling hydrocarbons from an upper portion of said fractionating column, returning at least a portion of said mixture to said alkylation zone; withdrawing a stream comprising a mixture of light acid-soluble organic material, hydrogen fluoride, and low boiling hydrocarbons intermediate to an upper portion and a lower portion of said fractionating column; passing said stream to a settling zone where a hydrocarbon phase is separated therefrom; passing said resulting hydrocarbon phase to a stripping zone and removing therefrom absorbed hydrogen fluoride by means of a stripping medium comprising paraffins to be alkylated in said alkylation zone and returning a resulting mixture of hydrogen fluoride and alkylatable paraffins to an upper portion of said fractionating column; withdrawing a resulting light acid-soluble organic material from a lower portion of said stripping zone; withdrawing a heavy acid-soluble organic material from a lower portion of said fractionating column; passing said heavy acid-soluble organic material to a separator wherein an organic phase is separated from an aqueous phase, and returning at least a portion of said organic phase to said alkylation zone as a desulfurizing agent.

3. A process for alkylating an alkylatable hydrocarbon with an olefin which comprises: alkylating said alkylatable hydrocarbon with said olefin in the presence of hydrogen fluoride catalyst; separating a resulting reaction mixture effluent into a liquid hydrocarbon phase and a liquid hydrogen fluoride catalyst phase; passing a portion of said catalyst phase into a fractional distillation zone and therein fractionating same; removing hydrogen fluoride from an upper portion of said fractional distillation zone and returning a portion of same to said alkylating operation; withdrawing a mixture of light acid-soluble organic material and hydrogen fluoride from said fractional distillation zone intermediate an upper portion and a lower portion of said fractional distillation zone, passing said mixture into a stripping zone, therein contacting said mixture with a hydrocarbon stream comprising hydrocarbons to be alkylated in said alkylation step passed into the lower portion of said stripping zone and stripping hydrogen fluoride from said mixture; and withdrawing a resulting mixture of hydrogen fluoride and alkylatable hydrocarbon from the upper portion of said stripping zone and passing same into the upper portion of said fractional distillation zone.

4. The process of claim 3 wherein said alkylatable hydrocarbon is an alkylatable isoparaffin.

5. The process of claim 4 wherein said isoparaffin is isobutane and said olefin is a mixture of butenes.

6. The process of claim 5 wherein said catalyst phase passed into said fractional distillation zone is heated to a temperature of from 235° F. to 260° F. prior to its introduction into said fractional distillation zone, and said fractional distillation zone is operated with a bottom temperature of from 260° F. to 300° F., a bottom pressure of from 25 to 50 pounds per square inch absolute, a top temperature of from 85° F. to 115° F. and a top pressure of from 20 to 40 pounds per square inch absolute.

JOHN GORDON ALLEN.

REFERENCES CITED

The following references are of record in the file of this patent:

UNITED STATES PATENTS

| Number | Name | Date |
| --- | --- | --- |
| 2,111,822 | Sullivan | Mar. 22, 1938 |
| 2,327,534 | Lambert | Aug. 24, 1943 |
| 2,388,919 | Iverson | Nov. 13, 1945 |
| 2,393,857 | Frey | Jan. 29, 1946 |
| 2,414,626 | Allen | Jan. 21, 1947 |
| 2,415,003 | Cole | Jan. 28, 1947 |